Patented Jan. 29, 1946

2,393,753

UNITED STATES PATENT OFFICE 2,393,753

COMPOSITIONS CONTAINING DIAZINYL CARBOXY-ALKYL SULPHIDES

Gaetano F. D'Alelio and James W. Underwood, Pittsfield, Mass., assignors to General Electric Company, a corporation of New York No Drawing. Application February 28, 1942, Serial No. 432,894

21 Claims. (Cl. 260—42)

This invention relates to the production of new materials and more particularly is concerned with synthetic compositions of particular utility in the plastics and coating arts and which contain, or are produced from, diazinyl carboxy-alkyl sulphides.

This application is a continuation-in-part of our copending application Serial No. 423,564, filed December 18, 1941, now Patent 2,347,992, issued May 2, 1944, and assigned to the same assignee as the present invention.

The diazinyl carboxy-alkyl sulphides used in carrying the present invention into effect may be represented by the following general formula:

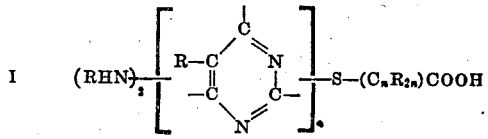

In the above formula $n$ represents an integer and is at least 1 and not more than 2, and R represents a member of the class consisting of hydrogen and monovalent hydrocarbon and substituted hydrocarbon radicals, more particularly halo-hydrocarbon radicals. From a consideration of this formula it will be seen that, since $n$ represents an integer which is 1 or 2, the linkage of the carboxy-alkyl grouping to the sulphur atom in all cases will be alpha or beta to the carboxy grouping. It also will be observed that linkage of the diazinyl grouping to the sulphur atom is through a carbon atom.

Illustrative examples of radicals that R in the above formula may represent are: aliphatic (e. g., methyl, ethyl, propyl, isopropyl, allyl, butyl, secondary butyl, isobutyl, butenyl, amyl, methallyl, tertiary butyl, crotyl, ethallyl, heptyl, isoheptyl, octyl, decyl, isoamyl, hexyl, etc., including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, phenylisopropyl, cinnamyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals are chloromethyl, chloroethyl, chlorophenyl, dichlorophenyl, chlorocyclohexy, ethyl chlorophenyl, phenyl chloroethyl, bromoethyl, bromopropyl, bromotolyl, iodophenyl, etc. Preferably R in Formula I is hydrogen. However, there also may be used in carrying the present invention into effect chemical compounds such, for instance, as those represented by the general formulas:

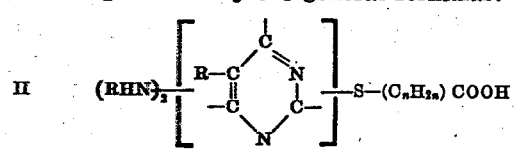

and, more particularly,

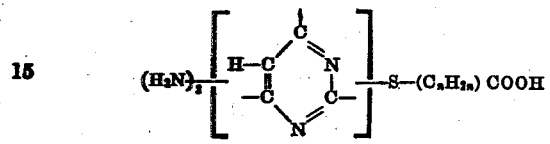

where $n$ and R have the same meanings as above given with reference to Formula I.

Instead of the pyrimidine (1,3-diazine) derivatives represented by the above formulas, corresponding derivatives of the 1,2-diazines and of the 1,4-diazines may be used.

The diazinyl carboxy-alkyl sulphides used in carrying the present invention into effect are more fully described and are specifically claimed in our above-mentioned copending application Serial No. 423,564. As pointed out in this copending application, the diazinyl carboxy-alkyl sulphides employed in practicing our invention are prepared, for example, by effecting reaction, in the presence of a hydrohalide acceptor, between a diamino [(—NHR)$_2$] mercapto pyrimidine and a halo-alkyl monobasic acid or a water-soluble salt of such an acid, e. g., an ammonium salt or an alkali-metal salt. Preferably there is used an alkali-metal salt, for instance the sodium or potassium salt. When a salt of the acid is used, there is first produced a salt (for example, an ammonium or an alkali-metal salt depending upon the particular starting reactant) of the diamino pyrimidyl carboxy-alkyl sulphide. The carboxy derivative is obtained by treating this salt with hydrochloric, hydrobromic, sulphuric or other suitable organic or inorganic acid in an amount just sufficient to decompose the salt and to convert the —COOM grouping of the pyrimidine derivative to a —COOH grouping.

Specific examples of diazinyl carboxy-alkyl sulphides that may be employed in producing the compositions of this invention are listed below:

4,6-diamino pyrimidyl-2 carboxy-methyl sulphide
2,6-diamino pyrimidyl-4 carboxy-methyl sulphide
4,6-di-(methylamino) pyrimidyl-2 carboxy-methyl sulphide 4,6-diamino pyrimidyl-2 alpha-(carboxy-ethyl) sulphide
4,6-diamino pyrimidyl-2 beta-(carboxy-ethyl) sulphide
4-amino 6-methylamino pyrimidyl-2 carboxy-methyl sulphide
2-amino 6-ethylamino pyrimidyl-4 carboxy-methyl sulphide
4,6-diamino 5-methyl pyrimidyl-2 carboxy-methyl sulphide
2,6-diamino 5-methyl pyrimidyl-4 carboxy-methyl sulphide
2,6-diamino pyrimidyl-4 alpha-(carboxy-ethyl) sulphide
2,6-diamino pyrimidyl-4 beta-(carboxy-ethyl) sulphide
4,6-di-(methylamino) pyrimidyl-2 beta-(carboxy-ethyl) sulphide
4,6-di-(chloroanilino) 5-methyl pyrimidyl-2 alpha-(carboxy-ethyl) sulphide
4-ethylamino 6-anilino 5-butyl pyrimidyl-2 alpha-(alpha-methyl carboxy-ethyl) sulphide
4-propylamino 6-xylidino 5-methyl pyrimidyl-2 alpha-(alpha-phenyl carboxy-propyl) sulphide
4,6-di-(cyclohexylamino) pyrimidyl-2 alpha-(carboxy-ethyl) sulphide
2-cyclopentylamino 6-phenethylamino 5-tolyl pyrimidyl-4 carboxy-methyl sulphide
4,6-diamino pyrimidyl-2 beta-(alpha-cyclohexyl carboxy-butyl) sulphide
2-benzylamino 6-phenethylamino pyrimidyl-4 alpha-(alpha-phenyl beta-tolyl carboxy-ethyl) sulphide
4-amino 6-allylamino 5-cyclohexenyl pyrimidyl-2 carboxy-methyl sulphide
4,6-di-(naphthylamino) pyrimidyl-2 alpha-(carboxy-ethyl) sulphide
2-chlorotoylamino 6-amino pyrimidyl-4 beta-(carboxy-ethyl) sulphide
2,6-diamino pyrimidyl-4 alpha-(carboxy-propyl) sulphide
4,6-diamino pyrimidyl-2 beta-(carboxy-butyl) sulphide
2,6-diamino pyrimidyl-4 alpha-(carboxy-butyl) sulphide
2,6-diamino pyrimidyl-4 alpha-(carboxy-pentyl) sulphide
2,6-diamino pyrimidyl-4 beta-(carboxy-pentyl) sulphide
4,6-diamino pyrimidyl-2 alpha-(alpha-chlorophenyl carboxy-butyl) sulphide
2,6-diamino pyrimidyl-4 alpha-(carboxy-hexyl) sulphide
4,6-diamino pyrimidyl-2 beta-(carboxy-hexyl) sulphide
4,6-diamino 5-methyl pyrimidyl-2 beta-(carboxy-propyl) sulphide
2,6-diamino 5-phenyl pyrimidyl-4 alpha-(carboxy-butyl) sulphide
4,6-diamino 5-cyclohexyl pyrimidyl-2 beta-(carboxy-butyl) sulphide
4,6-diamino 5-chlorophenyl pyrimidyl-2 alpha-(carboxy-butyl) sulphide
2,6-diamino 5-cyclohexenyl pyrimidyl-4 beta-(carboxy-pentyl) sulphide
4,6-diamino 5-ethyl pyrimidyl-2 alpha-(carboxy-pentyl) sulphide
4,6-di-(ethylamino) 5-bromotolyl pyrimidyl-2 beta-(carboxy-hexyl) sulphide
2,6-di-(propylamino) 5-tolyl pyrimidyl-4 alpha-(carboxy-hexyl) sulphide
4,6-di-(chloroanilino) 5-phenyl pyrimidyl-2 alpha-(carboxy-ethyl) sulphide Additional examples of diazinyl carboxy-alkyl sulphides that may be used in practicing the present invention are given in our above-identified co-pending application Serial No. 423,564.

The present invention is based on our discovery that new and valuable materials of particular utility in the plastics and coating arts can be produced by effecting reaction between ingredients comprising essentially an aldehyde, including polymeric aldehydes, hydroxyaldehydes and aldehyde-addition products, and certain diazinyl carboxy-alkyl sulphides, numerous examples of which have been given above and in the aforementioned copending application. These new reaction products are not only valuable in themselves, but find particular utility when incorporated into an acid-curing thermosetting resin, for example acid-curing thermosetting phenoplasts and aminoplasts. For instance, we may add a soluble, fusible aldehyde-reaction product of the diazinyl carboxy-alkyl sulphide to an acid-curing thermosetting resin and heat the resulting mixture. The aldehyde-sulphide reaction product accelerates the conversion of the acid-curing thermosetting resin to an insoluble, infusible state. Or, we may cause the diazinyl carboxy-alkyl sulphide itself to react with the acid-curing thermosetting resin and thus accelerate the curing of the resin. Or, we may form a rapidly curing resin by effecting reaction between ingredients comprising a diazinyl carboxy-alkyl sulphide of the kind above mentioned, an aldehyde, including polymeric aldehydes, hydroxyaldehydes and aldehyde-addition products, and a phenol (including phenol itself, cresols, xylenols, etc.), or an amino or amido compound (including imino and imido compounds), e. g., aminotriazoles, aminotriazines, urea, thiourea, dicyandiamide, etc.

The resin syrups and molding compositions of this invention may be stored for long periods of time without material alteration. In marked contrast the prior acid-curing thermosetting resins, more particularly those containing direct or active curing catalysts such as acids, e. g., hydrochloric, ethyl sulphuric, phthalic, chloroacetic, phosphoric, etc., lacked time or storage stability. This necessitated early use of the material after incorporating the catalyst.

Further, the molding compositions of this invention cure rapidly under heat or under heat and pressure and have good plastic flow during molding. Hence molded articles of even the most complicated designs can be made rapidly and economically. The cured compositions have good color, excellent water resistance and surface finish and, in general, meet the strength, hardness and other requirements of the particular service application.

In practicing the present invention the condensation between the reactants may be carried out under acid, alkaline or neutral conditions at normal or at elevated temperatures. Any substance or catalyst which has an alkaline or an acid nature may be used to obtain the acid, alkaline or neutral condition, as for example, ammonia, sodium hydroxide, calcium hydroxide, methyl amine, diethyl amine, tri-isopropanol amine, ethanol amines, etc.; mixtures of such alkaline substances; inorganic or organic acids such as hydrochloric, sulphuric, phosphoric, acetic, acrylic, crotonic, malonic, etc.; mixtures of such acids; acid salts such as sodium acid sulphate, monosodium phosphate, monosodium phthalate, etc.; basic salts such as ammonium carbonate, potassium carbonate, sodium acetate, etc.; or mixtures of such salts.

We may condense the components used in practicing this invention under various conditions. For example, all the components may be mixed together and the reaction caused to proceed under acid, alkaline or neutral conditions. Or, we may form an acid-curing thermosetting resin (e. g., an acid-curing partial condensation product of ingredients comprising a phenol and an aldehyde, an acid-curing partial condensation product of ingredients comprising an amidogen compound, e. g., melamine, malonic diamide, maleic diamide, urea, thiourea, iminourea, etc., and an aldehyde, etc.), add the diazinyl carboxyalkyl sulphide thereto and effect further condensation. Or, we may first partially condense the diamino diazinyl carboxy-alkyl sulphide with an aldehyde under acid, alkaline or neutral conditions and then add thereto at least one other aldehyde-reactable organic compound, e. g., a phenol, aniline, a urea, etc., and effect further condensation. Also, we may separately partially condense a diamino diazinyl carboxy-alkyl sulphide and a different aldehyde-reactable organic compound with an aldehyde and then mix the two products of partial condensation and effect further condensation therebetween. The components of each reaction product may be initially condensed under acid, alkaline or neutral conditions.

Still other ways may be employed in combining the components and in producing the unmodified and modified condensation products of this invention, as readily will be understood by those skilled in the art as the description of the invention proceeds. These condensation reactions may be carried out under a wide variety of time, pressure and temperature conditions. The temperature of reaction may vary from room temperature to the reflux temperature of the reactants at reduced, atmospheric or superatmospheric pressures.

In order that those skilled in the art better may understand how the present invention may be carried into effect, the following illustrative examples thereof are given. All parts are by weight.

Example 1

|  | Parts |
|---|---|
| 4,6-diamino pyrimidyl-2 carboxy-methyl sulphide | 20.0 |
| Aqueous formaldehyde (approx. 37.1% HCHO) | 81.0 | were placed in a flask and shaken continuously for 5 hours at room temperature. A sample of the resulting resinous solution, together with the undissolved matter present therein, was placed on a 140° C. hotplate. The resin bodied quickly on the hotplate to an infusible state. It possessed excellent cohesive characteristics and could be removed from the hotplate in sheet form.

Example 2

|  | Parts |
|---|---|
| 4,6-diamino pyrimdyl-2 carboxy-methyl sulphide | 20.0 |
| Aqueous formaldehyde (approx. 37.1% HCHO) | 64.8 | were heated together under reflux at the boiling temperature of the mass for 5 minutes. The reaction mixture was cooled and filtered. The residue was washed and dried at room temperature. The resulting resinous condensation product of formaldehyde and 4,6-diamino pyrimidyl-2 carboxy-methyl sulphide is suitable for use in curing acid-curing thermosetting resins, as shown by the following examples:

Example 3

|  | Parts |
|---|---|
| Urea | 30.0 |
| Aqueous formaldehyde (approx. 37.1% HCHO) | 64.8 |
| Aqueous ammonia (approx. 28% NH$_3$) | 3.0 |
| Aqueous solution of sodium hydroxide (0.5 N) | 2.0 |
| Curing agent from Example 2 | 4.0 | were heated together under reflux at the boiling temperature of the mass for 15 minutes. The resulting resinous condensation product was mixed with 34 parts alpha cellulose in flock form and 0.2 part of a mold lubricant, specifically zinc stearate, to form a molding (moldable) composition. The resulting wet molding compound was dried at 70° C. until sufficient moisture had been removed to provide a material that could be molded satisfactorily. A sample of the dried and ground molding composition was molded for 5 minutes at 140° C. under a pressure of 6,750 pounds per square inch. A well-cured molded article having a well-knit and homogeneous structure was obtained. The molding compound showed good plastic flow during molding.

Example 4

|  | Parts |
|---|---|
| Melamine | 37.8 |
| Aqueous formaldehyde (approx. 37.1% HCHO) | 72.9 |
| Aqueous ammonia (approx. 28% NH$_3$) | 1.7 |
| Aqueous solution of sodium hydroxide (0.5 N) | 2.0 |
| Curing agent from Example 2 | 4.0 | were heated together under reflux at the boiling temperature of the mass for 12 minutes. A molding compound was made from the resulting resinous syrup by mixing therewith 39 parts alpha cellulose and 0.2 part zinc stearate. The wet compound was dried as described under Example 3. A sample of the dried and ground molding composition was molded for 5 minutes at 140° C. under a pressure of 5,600 pounds per square inch. The molded article was well-cured and had a well-knit and homogeneous structure. It had excellent resistance to water as shown by the fact that when it was immersed in boiling water for 15 minutes, followed by immersion in cold water for 5 minutes, it absorbed only 0.55% by weight of water. The molding compound showed good plastic flow during molding as evidenced by the amount of flash on the molded piece.

Example 5

|  | Parts |
|---|---|
| Thiourea | 38.0 |
| Aqueous formaldehyde (approx. 37.1% HCHO) | 81.0 |
| Aqueous ammonia (approx. 28% NH$_3$) | 3.5 |
| Aqueous solution of sodium hydroxide (0.5 N) | 2.5 |
| Curing agent from Example 2 | 5.0 |

The above components were mixed and heated together under reflux at boiling temperature for 30 minutes. The resinous syrup produced in this manner was mixed with 43 parts alpha cellulose and 0.2 part zinc stearate. The resulting wet molding compound was dried at room temperature. A sample of the dried and ground compound was molded as described under Example 4, yielding a well-cured and well-knit, homogeneous molded piece. The molding compound showed excellent flow characteristics during molding.

The following examples illustrate the use of a pyrimidyl carboxy-alkyl sulphide of the kind with which this invention is concerned as a reactant in the preparation of rapidly curing thermosetting resins:

Example 6

A syrupy phenolic resin was prepared from the following components:

| | Parts |
|---|---|
| Phenol (95% phenol, 5% water) | 94.7 |
| Aqueous formaldehyde (approx. 37.1% HCHO) | 195.0 |
| Sodium carbonate | 2.19 |

The above ingredients were heated with constant stirring at an average temperature of 65° C. over a period of 4½ hours. The highest temperature reached during the reaction period was 95° C. and the lowest was 50° C. The clear resinous syrup is referred to in the following formula as "syrupy phenolic resin":

| | Parts |
|---|---|
| Syrupy phenolic resin | 250.0 |
| 4,6-diamino pyrimidyl-2 carboxy-methyl sulphide | 12.5 |
| Glycerine | 5.0 | were mixed together and the resulting mixture then was dehydrated under a reduced pressure of approximately 40 mm. mercury. During the dehydration period the resin temperature was raised slowly to 110-115° C. over a period of approximately 45-60 minutes. When all the water had been removed in this manner, the molasses-like casting resin thereby obtained was poured into a container. The resin was heated in this container for about 16 hours at 83° C. The resin cured to an insoluble and infusible state. It was transparent, clear, hard and light in color.

Example 7

| | Parts |
|---|---|
| Syrupy phenolic resin such as described under Example 6 | 125.0 |
| 4,6-diamino pyrimidyl-2 carboxy-methyl sulphide | 6.3 | were heated together under reflux at the boiling temperature of the mass for 15 minutes, yielding a solution that was clear but which showed some evidence of clouding around the edges of the reaction vessel. The resinous condensation product thereby produced was mixed with 44 parts alpha cellulose in flock form and 0.2 part zinc stearate. The wet molding compound was air-dried and then was ground. A sample of the dried and ground compound was molded for 15 minutes at 140° C. under a pressure of 5,600 pounds per square inch. A well-cured, well-knit and homogeneous molded piece was obtained. The molded article showed excellent water resistance when immersed in boiling water for 15 minutes. The molding compound showed good plastic flow during molding.

Example 8

A syrupy phenolic resin was prepared from the following components:

| | Parts |
|---|---|
| Phenol | 90.0 |
| Aqueous formaldehyde (approx. 37.1% HCHO) | 195.0 |
| Potassium carbonate | 2.85 |

These ingredients were heated together at 65-70° C. for about 4 hours, yielding a liquid phenol-formaldehyde partial condensation product which is identified in the following formula as "syrupy phenolic resin":

| | Parts |
|---|---|
| Syrupy phenolic resin | 60.0 |
| 4,6-diamino pyrimidyl-2 carboxy-methyl sulphide | 4.5 | were heated together under reflux at the boiling temperature of the mass for 15 minutes. A molding composition was made from the resulting resinous syrup by mixing therewith 21.5 parts alpha cellulose and 0.1 part zinc stearate. The wet compound was dried at 70° C. A sample of the dried and ground molding composition was molded for 10 minutes at 140° C. under a pressure of 4,500 pounds per square inch. The molded article was well cured throughout and had excellent resistance to water as shown by the fact that it absorbed only 1.03% by weight of water when immersed in boiling water for 15 minutes, followed by immersion in cold water for 5 minutes.

Examples 6, 7 and 8 illustrate the fact that the pyrimidyl carboxy-alkyl sulphides herein described are eminently satisfactory for use in curing acid-curing thermosetting resins of the phenoplast type.

Example 9

| | Parts |
|---|---|
| Urea | 30.0 |
| Aqueous formaldehyde (approx. 37.1% HCHO) | 64.8 |
| 4,6-diamino pyrimidyl-2 carboxy-methyl sulphide | 0.6 |
| Aqueous ammonia (approx. 28% NH$_3$) | 3.0 |
| Aqueous solution of sodium hydroxide (0.46 N) | 1.5 |

All of the above ingredients with the exception of the pyrimidine derivative were heated together under reflux at the boiling temperature of the mass for 15 minutes. The pyrimidyl carboxy-methyl sulphide was now added and refluxing was continued for an additional 5 minutes to cause the sulphide to intercondense with the urea-formaldehyde partial condensation product. The resulting resinous syrup was mixed with 33.4 parts alpha cellulose and 0.15 part zinc stearate to form a molding compound. The wet molding composition was dried at room temperature until sufficient moisture had been removed to provide a material that could be molded satisfactorily. A sample of the dried and ground molding compound was molded for 5 minutes at 140° C. under a pressure of 4,500 pounds per square inch. A well-cured molded piece having a well-knit and homogeneous structure was obtained.

Example 10

| | Parts |
|---|---|
| Thiourea | 38.0 |
| Aqueous formaldehyde (approx. 37.1% HCHO) | 81.0 |
| 4,6-diamino pyrimidyl-2 carboxy-methyl sulphide | 0.8 |
| Aqueous ammonia (approx. 28% NH$_3$) | 4.0 |
| Aqueous solution of sodium hydroxide (0.46 N) | 2.3 |

All of the above ingredients with the exception of the sulphide were heated together under reflux at the boiling temperature of the mass for 16 minutes. The sulphide was now added and heating under reflux was continued for an additional 30 minutes. The clear resinous solution thereby produced was mixed with 42.1 parts alpha cellulose and 0.2 part zinc stearate to form a molding compound. The wet molding composition was dried at 70° C. A sample of the dried and ground molding compound was molded for 6 minutes at 135° C. under a pressure of 4,500 pounds per square inch. A well-cured molded article having a well-knit, homogeneous structure was obtained. The molded piece had good resistance to water as shown by the fact that it absorbed only 2.4% by weight of water when tested for its water-resistance characteristics as described under Example 4. The molding compound showed excellent plastic flow during molding.

*Example 11*

| | Parts |
|---|---|
| Melamine | 37.8 |
| Aqueous formaldehyde (approx. 37.1% HCHO) | 72.9 |
| 4,6-diamino pyrimidyl-2 carboxy-methyl sulphide | 0.6 |
| Aqueous ammonia (approx. 28% NH$_3$) | 1.7 |
| Aqueous solution of sodium hydroxide (0.46 N) | 2.0 |

All of the above ingredients with the exception of the diamino carboxy-methyl sulphide were heated together under reflux at the boiling temperature of the mass for 15 minutes. The sulphide was now added and heating of the mass was continued until the sulphide had dissolved. A molding compound was produced by mixing the resulting resinous syrup with 38.4 parts alpha cellulose and 0.2 part zinc stearate. The wet molding compound was dried at 70° C. A well-cured molded article was obtained by molding a sample of the dried and ground molding compound for 4 minutes at 140° C. under a pressure of 4,500 pounds per square inch. The molded piece had excellent resistance to water as shown by the fact that it absorbed only 0.72% by weight of water when tested for its water-resistance characteristics as described under Example 4. It also had a well-knit and homogeneous structure. The molding compound showed good flow characteristics during molding.

*Example 12*

| | Parts |
|---|---|
| Melamine | 18.9 |
| Thiourea | 11.4 |
| Aqueous formaldehyde (approx. 37.1% HCHO) | 72.9 |
| 4,6-diamino pyrimidyl-2 carboxy-methyl sulphide | 0.6 |
| Aqueous ammonia (approx. 28% NH$_3$) | 1.7 |
| Aqueous solution of sodium hydroxide (0.46 N) | 2.0 |

A clear resinous syrup was prepared by heating all of the above components with the exception of the sulphide under reflux at the boiling temperature of the mass for 25 minutes. The sulphide was now added and the mixture was heated until the sulphide had dissolved therein. The resulting resinous syrup was mixed with 35.8 parts alpha cellulose and 0.2 part zinc stearate. The molding composition produced in this manner was dried at 70° C., after which it was pulverized to a fine powder. A well-cured molded piece was produced by molding a sample of the dried and ground compound for 5 minutes at 140° C. under a pressure of 4,500 pounds per square inch. The molded article absorbed only 0.46% by weight of water when tested for its water-resistance characteristics as described under Example 4.

*Example 13*

| | Parts |
|---|---|
| Soya bean protein | 38.0 |
| Aqueous formaldehyde (approx. 37.1% HCHO) | 81.0 |
| 4,6-diamino pyrimidyl-2 carboxy-methyl sulphide | 0.3 |
| Aqueous ammonia (approx. 28% NH$_3$) | 1.0 |
| Aqueous solution of sodium hydroxide (0.46 N) | 2.3 |

All of the above ingredients with the exception of the sulphide were heated together under reflux at boiling temperature for 1 minute. To the resulting pasty mass were added the following components:

| | Parts |
|---|---|
| Para-aminobenzene sulphonamide | 1.3 |
| Aqueous formaldehyde (approx. 37.1% HCHO) | 5.0 |
| Water | 5.0 |

The entire mass was heated for 3 minutes at boiling temperature under reflux. The diamino pyrimidyl carboxy-methyl sulphide was now added and refluxing was continued for an additional 1 minute. The resinified product was mixed with 40.8 parts alpha cellulose and 0.2 part zinc stearate until the entire paste was homogeneous. The pasty mass was dried at 70° C. A well-molded product was obtained by molding a sample of the dried and ground composition for 3 minutes at 140° C. under a pressure of 4,500 pounds per square inch.

*Example 14*

| | Parts |
|---|---|
| Aminotriazole, specifically para-tolyl guanazole | 28.4 |
| Aqueous formaldehyde (approx. 37.1% HCHO) | 36.2 |
| 4,6-diamino pyrimidyl-2 carboxy-methyl sulphide | 0.4 |
| Aqueous solution of sodium hydroxide (0.46 N) | 1.6 | were mixed and allowed to stand for 5 minutes. Heat was applied until two layers had formed. To the resulting reaction mass were added 22.2 parts alpha cellulose and 0.1 part zinc stearate. The resulting molding composition was dried at 70° C. A well-cured molded piece having a well-knit and homogeneous structure was produced by molding a sample of the dried and ground molding compound for 4 minutes at 145° C. under a pressure of 4,500 pounds per square inch. The molded article had excellent resistance to water, as shown by the fact that it absorbed only 0.56% by weight of water when tested for its water-resistance characteristics as described under Example 4.

It will be understood, of course, by those skilled in the art that our invention is not limited to condensation products obtained by reaction of ingredients comprising an aldehyde and the specific diamino diazinyl carboxy-alkyl sulphide named in the above illustrative examples. Thus, instead of 4,6-diamino pyrimidyl-2 carboxy-methyl sulphide, we may use 2,6-diamino pyrimidyl-4 carboxy-methyl sulphide (2,4-diamino pyrimidyl-6 carboxy-methyl sulphide), diamino pyrimidyl alpha-(carboxy-ethyl) sulphide or any other organic sulphide (or mixture thereof) of the kind with which this invention is concerned, numerous examples of which compounds have been given hereinbefore and in our copending application No. 423,564.

In producing these new condensation products the choice of the aldehyde is dependent largely upon economic considerations and upon the particular properties desired in the finished product. We prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, methacrolein, acrolein, crotonaldehyde, benzaldehyde, furfural, hydroxyaldehydes (e. g., glycollic aldehyde, glyceraldehyde, etc.), mixtures thereof, or mixtures of formaldehyde (or compounds engendering formaldehyde) with such aldehydes. Illustrative examples of aldehyde-addition products that may be employed instead of the aldehydes themselves are the mono- and poly-(N-carbinol) derivatives, more particularly the mono- and poly-methylol derivatives of urea, thiourea, selenourea and iminourea, and of substituted ureas, selenoureas, thioureas and iminoureas (numerous examples of which are given in D'Alelio copending application Serial No. 377,524, filed February 5, 1941), mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of the amino triazoles, mono- and poly-(N-carbinol) derivatives of the aminotriazines, etc. Particularly good results are obtained with active methylene-containing bodies such as a methylol urea, more particularly mono- and dimethylol ureas, and a methylol aminotriazine, e. g., mono-methylol melamine and polymethylol melamines (di-, tri-, tetra-, penta- and hexamethylol melamines). Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydic reactant to the diazine derivative may be varied over a wide range depending, for example, upon the particular properties desired in the final product. Thus, we may use, for example, from 0.5 to 6 or 7 mols of an aldehyde, e. g., formaldehyde, for each mol of diazine derivative. The lower amounts are preferred when the reaction product of the aldehyde and the diazine derivative are to be used as agents for accelerating the conversion of acid-curing thermosetting resins to an insoluble, infusible state. When the aldehyde is available for reaction in the form of an alkylol derivative, more particularly a methylol derivative such, for instance, as dimethylol urea, trimethylol melamine, etc., then higher amounts of such aldehyde-addition products ordinarily are used, for example from 1 to 12 or 15 or more mols of such alkylol derivatives for each mol of the diazine derivative.

When the diamino diazinyl carboxy-alkyl sulphide is used primarily as an intercondensable curing reactant for accelerating the conversion of acid-curing thermosetting resins to an insoluble, infusible state, only a relatively small amount of such sulphide ordinarily is required, for example an amount corresponding to from 0.4 or 0.5% to 5 or 6% by weight of the resin to be cured, calculated on the basis of the dry resin. In some cases it may be desirable to use higher amounts, for instance up to 10 or 15 or more parts by weight of the sulphide per 100 parts (net dry) of the acid-curing thermosetting resin. When the sulphide is incorporated into the acid-curing thermosetting resin in the form of a soluble, fusible aldehyde-reaction product thereof, then higher amounts of such reaction product ordinarily are used as compared with the amount employed when using the sulphide itself. The sulphide or its partial reaction product with an aldehyde may be incorporated into the acid-curing thermosetting resin either prior to, during or after the formation of the resin or prior to, during or after the formation of a molding composition containing the acid-curing thermosetting resin.

Examples of acid-curing thermosetting resins, the curing of which is accelerated by the diamino diazinyl carboxyalkyl sulphides herein described or by their soluble, fusible aldehyde-reaction products, are the acid-curing phenol-aldehyde resins, amino-triazine-aldehyde resins (e. g., melamine-formaldehyde resins), urea-aldehyde resins, urea-aminotriazine-aldehyde resins, aminotriazole-aldehyde resins, protein-aldehyde resins (e. g., casein-formaldehyde resins), resinous condensation products of aldehydes such as formaldehyde with polyamides as, for instance, malonic diamide, maleic diamide, fumaric diamide, itaconic diamide, etc. Other examples of amino or amido compounds that may be condensed with aldehydes such as hereinbefore mentioned by way of illustration in forming an acid-curing thermosetting resin, more particularly an acid-curing aminoplast, are thiourea, diurea, diethylene triurea, methyl urea, acetyl urea, benzoyl urea, phenyl thiourea, asymmetrical diethyl urea, allyl urea, 2-chloroallyl urea, ethylidene urea, guanyl urea, biguanide, aminoguanidine, aminotriazines (e. g., melamine, ammeline, ammelide, melem, melam, melon, etc.), aminotriazoles, etc. Suitable mixtures of such compounds also may be used.

Phenol itself and various substituted phenols, for example the cresols, the xylenols, etc., may be condensed with aldehydes, e. g., formaldehyde, furfural, etc., to form acid-curing thermosetting resins of the phenoplast type, and these thermosetting resins then can be cured to the insoluble and infusible state with the aid of the hereindescribed diazinyl carboxy-alkyl sulphides or with the soluble, fusible aldehyde-reaction products of such sulphides. The curing agents of this invention, when incorporated into acid-curing phenoplasts, also impart improved color and light stability to the cured product. This was quite unexpected, since in no way could it have been predicted that the introduction of a diazine derivative containing an —NHR radical and, also, a —COOH radical into an acid-curing phenoplast would improve the color of the end-product and, in addition, facilitate the conversion of the potentially reactive resin to a cured (insoluble and infusible) state. Another advantage accruing from our invention resides in the simplicity with which casting resins, particularly phenol-aldehyde casting resins adapted to be hardened under heat (e. g., at temperatures of the order of about 60° to 130° C.), can be produced.

If desired, the fundamental resins of this invention may be modified by introducing other bodies before, during or after condensation between the primary components. Numerous examples of modifying agents that may be employed are given, for instance, in D'Alelio and Holmes Patent No. 2,265,688, issued December 9, 1941, page 3, column 2, lines 53–75, page 4, column 1, lines 1–40, which patent is assigned to the same assignee as the present invention.

Thermosetting molding compositions comprising a filler and an acid-curing thermosetting resin carrying a curing agent comprising a diamino diazinyl carboxy-alkyl sulphide of the kind herein described, or a soluble, fusible aldehyde-reaction product of such a sulphide, may be molded into a variety of shapes under heat and pressure, more particularly at temperatures of the order of 100° to 200° C., preferably from approximately 120° to 180° C. The molding compositions show good plastic flow during molding, since the curing agent not only functions as such but also generally serves to impart improved plastic flow to the molding composition. Molded articles of manufacture comprising the molded heat-hardened molding compositions of this invention have a good surface finish, show no evidence of "bleeding" the curing agent, are well cured throughout, and show no loss in any of their other useful properties due to the presence of the diazinyl carboxy-alkyl sulphide or aldehyde-reaction product thereof.

What we claim as new and desire to secure by Letters Patent of the United States is:

1. A composition comprising an acid-curing thermosetting resin carrying a curing agent therefor comprising a compound selected from the class consisting of (1) compounds represented by the general formula

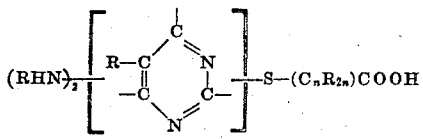

where $n$ represents an integer and is at least 1 and not more than 2, and R represents a member of the class consisting of hydrogen and monovalent hydrocarbon and halo-hydrocarbon radicals; and (2) soluble, fusible aldehhyde-reaction products of the compounds of (1).

2. A composition comprising an acid-curing, thermosetting phenol-aldehyde resin having incorporated therein a compound represented by the general formula

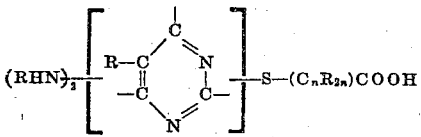

where $n$ represents an integer and is at least 1 and not more than 2, and R represents a member of the class consisting of hydrogen and monovalent hydrocarbon and halo-hydrocarbon radicals.

3. A composition comprising an acid-curing, thermosetting amidogen-aldehyde resin having incorporated therein a compound represented by the general formula

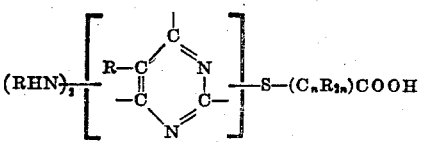

where $n$ represents an integer and is at least 1 and not more than 2, and R represents a member of the class consisting of hydrogen and monovalent hydrocarbon and halo-hydrocarbon radicals.

4. A composition of matter comprising the product of reaction of ingredients comprising an aldehyde and a compound represented by the general formula

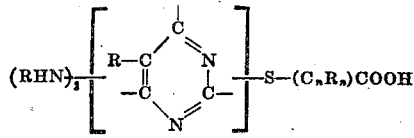

where $n$ represents an integer and is at least 1 and not more than 2, and R represents a member of the class consisting of hydrogen and monovalent hydrocarbon and halo-hydrocarbon radicals.

5. A composition as in claim 4 wherein the aldehyde is formaldehyde.

6. A composition comprising the product of reaction of ingredients comprising an aldehyde and a compound represented by the general formula

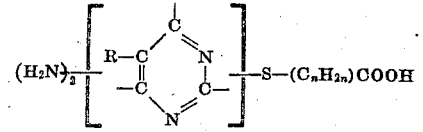

where $n$ is an integer and is at least 1 and not more than 2.

7. A composition comprising the condensation product of ingredients comprising formaldehyde and a diamino pyrimidyl carboxy-methyl sulphide.

8. A composition comprising the product of reaction of ingredients comprising a phenol, an aldehyde and a compound represented by the general formula

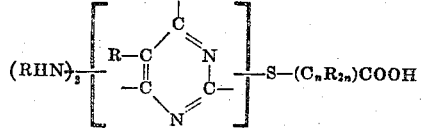

where $n$ represents an integer and is at least 1 and not more than 2, and R represents a member of the class consisting of hydrogen and monovalent hydrocarbon and halo-hydrocarbon radicals.

9. A composition comprising the product of reaction of ingredients comprising a urea, an aldehyde and a compound represented by the general formula

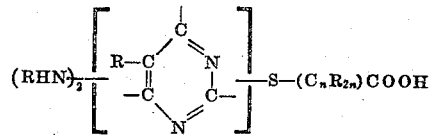

where $n$ represents an integer and is at least 1 and not more than 2, and R represents a member of the class consisting of hydrogen and monovalent hydrocarbon and halo-hydrocarbon radicals.

10. A composition comprising the product of reaction of ingredients comprising an aminotriazine, an aldehyde and a compound represented by the general formula

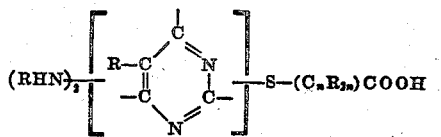

where $n$ represents an integer and is at least 1 and not more than 2, and R represents a member of the class consisting of hydrogen and monovalent hydrocarbon and halo-hydrocarbon radicals.

11. A heat-curable resinous condensation product of ingredients comprising urea, formaldehyde and a compound represented by the general formula

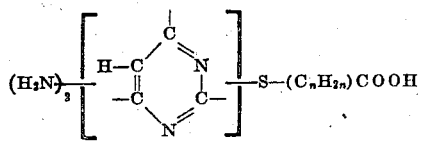

where $n$ represents an integer and is at least 1 and not more than 2.

12. A product comprising the cured resinous condensation product of claim 11.

13. A composition comprising the resinous product of reaction of (1) a partial condensation product of ingredients comprising a phenol and an aldehyde, and (2) a compound represented by the general formula

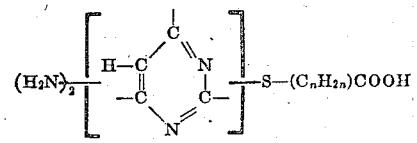

where $n$ represents an integer and is at least 1 and not more than 2.

14. A composition comprising the resinous product of reaction of (1) a partial condensation product of ingredients comprising a urea and an aldehyde, and (2) a compound represented by the general formula

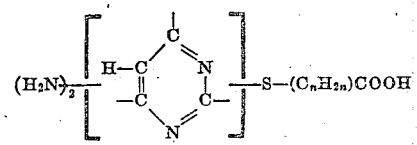

where $n$ represents an integer and is at least 1 and not more than 2.

15. A resinous composition comprising the product of reaction of (1) a partial condensation product obtained by reaction, while admixed with an alkaline substance, of ingredients comprising urea and formaldehyde, and (2) a diamino pyrimidyl carboxy-methyl sulphide.

16. A resinous composition comprising the product of reaction of (1) a partial condensation product obtained by reaction, while admixed with an alkaline substance, of ingredients comprising melamine and formaldehyde, and (2) a diamino pyrimidyl carboxy-methyl sulphide.

17. A composition comprising the resinous product of reaction of ingredients comprising urea, formaldehyde and 4,6-diamino pyrimidyl-2 carboxy-methyl sulphide.

18. A thermosetting molding composition comprising a filler and an acid-curing partial condensation product of ingredients comprising urea and formaldehyde, said condensation product having incorporated therein a small amount of a curing agent comprising a diamino pyrimidyl carboxy-methyl sulphide.

19. The method of preparing new condensation products which comprises effecting reaction between ingredients comprising an aldehyde and a compound represented by the general formula

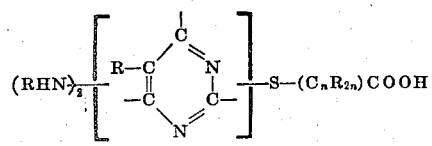

where $n$ represents an integer and is at least 1 and not more than 2, and R represents a member of the class consisting of hydrogen and monovalent hydrocarbon and halo-hydrocarbon radicals.

20. The method which comprises effecting partial reaction between ingredients comprising urea and formaldehyde under alkaline conditions, adding to the resulting partial condensation product a small amount of a compound represented by the general formula

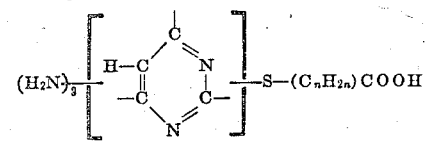

and causing the said compound to intercondense with the said partial condensation product.

21. A curing agent capable of accelerating the curing of an acid-curing thermosetting resin, said curing agent being the soluble, fusible product of reaction of ingredients including an aldehyde and a compound represented by the general formula

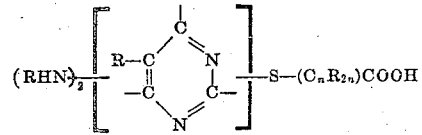

where $n$ represents an integer and is at least 1 and not more than 2, and R represents a member of the class consisting of hydrogen and monovalent hydrocarbon and halo-hydrocarbon radicals.

GAETANO F. D'ALELIO.
JAMES W. UNDERWOOD.

Certificate of Correction

Patent No. 2,393,753.        GAETANO F. D'ALELIO ET AL.        January 29, 1946.

It is hereby certified that errors appear in the printed specification of the above numbered patent requiring correction as follows: Page 1, first column, line 54, for "chlorocyclohexy" read *chlorocyclohexyl*; and second column, lines 8 to 10 inclusive, for that portion of the formula reading

page 7, second column, line 10, in the formula, for "$(C_nR_n)$" read $(C_nR_{in})$; line 26, for "R—C" read *H—C*; and that the said Letters Patent should be read with these corrections therein that the same may conform to the record of the case in the Patent Office.

Signed and sealed this 15th day of October, A. D. 1946.

[SEAL]

LESLIE FRAZER,
*First Assistant Commissioner of Patents.*